United States Patent
Zhang et al.

(10) Patent No.: US 8,837,325 B2
(45) Date of Patent: Sep. 16, 2014

(54) PAGING METHOD, LOCATION UPDATE METHOD AND DEVICE

(75) Inventors: Tao Zhang, Beijing (CN); Bo Lin, Beijing (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 414 days.

(21) Appl. No.: 13/283,200

(22) Filed: Oct. 27, 2011

(65) Prior Publication Data
US 2012/0039246 A1    Feb. 16, 2012

Related U.S. Application Data

(63) Continuation of application No. PCT/CN2009/071541, filed on Apr. 28, 2009.

(51) Int. Cl.
*H04L 12/28* (2006.01)
*H04B 7/14* (2006.01)
*H04W 4/00* (2009.01)
*H04M 11/04* (2006.01)
*H04W 24/00* (2009.01)
*H04W 68/02* (2009.01)
*H04W 88/08* (2009.01)

(52) U.S. Cl.
CPC ............ *H04W 68/02* (2013.01); *H04W 88/085* (2013.01)
USPC ........... 370/254; 370/315; 370/332; 370/338; 455/404.2; 455/456.1

(58) Field of Classification Search
CPC ... H04W 68/00; H04W 68/005; H04W 68/02; H04W 68/025; H04W 68/04; H04W 68/06; H04W 68/08; H04W 68/10; H04W 68/12; H04W 88/08; H04W 88/085; H04W 88/10; H04W 88/12; H04W 88/14; H04W 88/184; H04W 88/185; H04W 88/16; H04W 88/18; H04W 64/00; H04W 4/02; H04W 4/22; H04W 29/08657; H04W 76/007
USPC .............. 370/252, 254–255, 310–350, 395.2, 370/400–401; 455/404.2, 414.1–414.3, 455/422.1–423, 426.1, 434, 440, 455/456.1–456.3
See application file for complete search history.

(56) References Cited

U.S. PATENT DOCUMENTS 6,169,497 B1 * 1/2001 Robert .......................... 340/988
6,806,813 B1 * 10/2004 Cheng et al. ................... 340/8.1

(Continued)

FOREIGN PATENT DOCUMENTS

CN    1418446 A    5/2003
CN    1980466 A    6/2007

(Continued)

OTHER PUBLICATIONS

Samsung, "Correction on the Paging Optimization" Change Request 36.413 CR 0442 rev 8.5.1. 3GPP TSG-RAN WG3 Meeting #63bis. Seoul, Korea, Mar. 23-26, 2009. R3-090851.

(Continued)

*Primary Examiner* — Tri H Phan
(74) *Attorney, Agent, or Firm* — Brinks Gilson & Lione

(57) ABSTRACT

A paging method may reduce signaling overhead of system paging and save system paging resources. The method includes: receiving, by an eNodeB, a paging message, where the paging message carries a tracking area identity; paging a user equipment if the tracking area identity in the paging message is the tracking area identity of the eNodeB; and instructing a relay to page. A location update method is also disclosed, which reduces signaling load produced by location update. The method includes: generating, by a relay, a system message, where the system message includes a tracking area identity of the relay; and broadcasting the system message, and triggering a user equipment in a cell of the relay to initiate a location update request. The embodiments of the present invention disclose an eNodeB, a relay, a communication system.

24 Claims, 8 Drawing Sheets

(56) References Cited

U.S. PATENT DOCUMENTS

| | | | |
|---|---|---|---|
| 6,917,978 B1* | 7/2005 | Jinzaki | 709/227 |
| 7,016,690 B2* | 3/2006 | Corson et al. | 455/456.1 |
| 7,027,919 B2* | 4/2006 | Bernesi et al. | 701/500 |
| 7,392,056 B2* | 6/2008 | Corson et al. | 455/456.1 |
| 7,605,696 B2* | 10/2009 | Quatro | 340/539.13 |
| 2001/0007552 A1 | 7/2001 | Schiff et al. | |
| 2003/0013445 A1 | 1/2003 | Fujiwara et al. | |
| 2005/0054349 A1* | 3/2005 | Balachandran et al. | 455/456.1 |
| 2007/0271348 A1* | 11/2007 | Yang | 709/206 |
| 2008/0003943 A1 | 1/2008 | Maheshwari et al. | |
| 2008/0242341 A1 | 10/2008 | Wu et al. | |
| 2008/0268878 A1 | 10/2008 | Wang et al. | |
| 2008/0280625 A1* | 11/2008 | Larsen | 455/456.1 |
| 2010/0177681 A1* | 7/2010 | Sahinoglu | 370/328 |
| 2011/0044309 A1 | 2/2011 | Ye et al. | |
| 2011/0122822 A1 | 5/2011 | Wu et al. | |
| 2011/0171962 A1 | 7/2011 | Iwamura et al. | |
| 2011/0189976 A1 | 8/2011 | Wu et al. | |

FOREIGN PATENT DOCUMENTS

| | | |
|---|---|---|
| CN | 101043698 A | 9/2007 |
| CN | 101207840 A | 6/2008 |
| CN | 101272622 A | 9/2008 |
| EP | 1956852 A2 | 8/2008 |
| EP | 2180736 A1 | 4/2010 |
| JP | 2009022680 A | 2/2009 |
| JP | 2009049661 A | 3/2009 |
| JP | 2010525759 A | 7/2010 |
| JP | 2011530250 A | 12/2011 |
| RU | 2180159 C2 | 2/2002 |
| RU | 2260844 C2 | 9/2005 |
| WO | WO 2009025241 A1 | 2/2009 |
| WO | WO 2010073628 A1 | 7/2010 |
| WO | WO 2010089949 A1 | 8/2010 |

OTHER PUBLICATIONS

Office Action issued in corresponding Russian Patent Application No. 2011148131/08, mailed Nov. 15, 2012.

Office Action issued in corresponding Japanese Patent Application No. 2012-507571, mailed Jan. 8, 2013.

Extended European Search Report issued in corresponding European Patent Application No. 09843870.8, mailed Mar. 29, 2012.

Huawei, "Paging Optimization for CSG Deployments" Agenda Item 9.2.1, 3GPP TSG CT WG1 Meeting #55. Budapest, Hungary, Aug. 18-22, 2008. C1-083282.

Ericsson, "Issues Related to CSG Id List over S1" Agenda Item 7,6.1, 3GPP TSG SA WG2 Meeting #71. Budapest, Hungary, Feb. 2009. TD S2-091777.

Huawei, "Paging Optimization for 3G HNB" Agenda Item 9.3, 3GPP TSG-RAN WG3#63Bis. Seoul, Korea, Mar. 23-26, 2009. R3-090784.

Office Action issued in corresponding Chinese Patent Application No. 200980157587.4, mailed Mar. 5, 2013.

Search Report issued in corresponding Chinese Patent Application No. 200980157587.4, mailed Mar. 5, 2013.

Notice of Allowance issued in corresponding Russian Patent Application No. 2011148131/08, mailed Jan. 17, 2013.

Written Opinion of the International Searching Authority issued in corresponding PCT Patent Application No. PCT/CN2009/071541, mailed Feb. 11, 2010.

International Search Report issued in corresponding PCT Patent Application No. PCT/CN2009/071541, mailed Feb. 11, 2010.

* cited by examiner

PAGING METHOD, LOCATION UPDATE METHOD AND DEVICE

CROSS-REFERENCE TO RELATED APPLICATIONS

This application is a continuation of International Application No. PCT/CN2009/071541, filed on Apr. 28, 2009, which is hereby incorporated by reference in this entirety.

FIELD OF THE INVENTION

The present invention relates to the communication technologies, and in particular, to a paging method, location update method and device.

BACKGROUND OF THE INVENTION

In 2006, the ITU-R (ITU-Radiocommunication Sector, ITU-Radiocommunication sector) officially named B3G (Beyond 3G, Beyond 3G) technology as IMT-Advanced (International Mobile Telecommunications-Advanced, international mobile telecommunications-advanced) technology. In one aspect, the IMT-Advanced has a high requirement on system capacity. In another aspect, a high bandwidth spectrum that can support such huge capacity generally can only be found in a high frequency band. Path loss and penetration loss of such a high frequency band are relatively large, and it is hard to implement a good coverage. To meet the capacity requirement of the IMT-Advanced, a LTE-Advanced system proposed by the 3GPP (3rd Generation Mobile Group, 3rd generation mobile group) takes the relay technology as one of candidate technologies for improving the system capacity and coverage.

In a traditional network, wireless connection between an eNodeB (eNodeB, eNB) and a user equipment (User Equipment, UE) is a direct wireless connection, that is, a single-hop network. However, in the relay technology, one or multiple relays (Relay) are added between the eNodeB and the user equipment, responsible for forwarding a wireless signal sent by the eNodeB to the user equipment. One eNodeB may service multiple cells, and different cells are sorted into different TAs (Tracking Areas, tracking areas) according to certain rules. The user equipment, each time moving to a new TA, initiates a location update request to a network side, reporting its latest location information to the network side. A MME (Mobility Management Entity, mobility management entity) maintains a TA list for each user equipment according to the location information reported by the user equipment. Each time the network side pages a user equipment, and the MME searches out all eNodeBs associated with the TAs according to the current TA list of the user equipment, and sends a paging message to these eNodeBs.

In one aspect, the eNodeB does not acquire the TA information about its relays, and cannot acquire whether the paged user equipment camps on a cell of the eNodeB or a cell of its relays. Therefore, the eNodeB, when starting paging the cell of the eNodeB, sends the paging message to all its relays so that the relays start to page the specified user equipment.

Therefore, during the implementation of the present invention, the inventor finds that the prior art has the following problem.

To page a specified user equipment, paging needs to be performed in the cells of the eNodeB and cells of all relays of the eNodeB, which increases signaling overhead of system paging and wastes system paging resources. For the eNodeB, because the relay needs to allocate its paging resources to two wireless links from the user equipment to the relay and from the relay to the eNodeB, the relay has insufficient resources as compared against the eNodeB. Therefore, the problem of a waste of the paging resources becomes more severe.

In another aspect, when the relay moves to a cell of the eNodeB for the first time, the eNodeB broadcasts a system message in the tracking area to which the cell belongs. The relay forwards the system message to all user equipments camping on its cells. These user equipments are loaded into the cell of the eNodeB inside the relay, so generally these user equipments access the tracking area of the eNodeB for the first time. Therefore, according to the current protocol, all the user equipments of the relay undergo a location update.

Therefore, during the implementation of the present invention, the inventor finds that the prior art has further the following problem.

A great number of user equipments may exist in one mobile relay, and all the user equipments need to undergo a location update concurrently, causing great signaling load to the air interface in a short time, and hence affects normal voice and data communication. The mobile relay may be in a high-speed motion, and therefore, it may enter the coverage of a cell of another eNodeB in a short time. However, a great number of the user equipments undergo the location update concurrently and repeatedly, thereby causing heavy singling load.

SUMMARY OF THE INVENTION

An embodiment of the present invention provides a paging method to reduce signaling overhead of system paging and save system paging resources, where the method includes:

receiving, by an eNodeB, a paging message, where the paging message carries a tracking area identity;

paging, by the eNodeB, a user equipment if the tracking area identity in the paging message is the tracking area identity of the eNodeB; and instructing, by the eNodeB, a relay to page the user equipment if the tracking area identity in the paging message is the tracking area identity of the relay of the eNodeB.

An embodiment of the present invention further provides a location update method to reduce signaling load produced during location update, where the method includes:

generating, by a relay, a system message, where the system message includes a tracking area identity of the relay; and broadcasting, by the relay, the system message, and triggering a user equipment in a cell of the relay to initiate a location update request.

An embodiment of the present invention further provides a paging method to reduce signaling overhead of system paging and save system paging resources, where the method includes:

receiving, by a mobility management entity, a location update request message of a user equipment, where the location update request message carries a tracking area identity of a relay where the user equipment camps;

updating, by the mobility management entity, a tracking area list of a user equipment according to the tracking area identity; and issuing, by the mobility management entity, a paging message, where the paging message carries the tracking area list of the user equipment.

An embodiment of the present invention further provides an eNodeB to reduce signaling overhead of system paging and save system paging resources, where the eNodeB includes:

a receiving module, configured to receive a paging message, where the paging message carries a tracking area identity; and a paging module, configured to page a user equipment when the tracking area identity in the paging message is the tracking area identity of the eNodeB; and instruct a relay to page the user equipment when the tracking area identity in the paging message is the tracking area identity of the relay of the eNodeB.

An embodiment of the present invention further provides a relay to reduce signaling load produced during location update, where the relay includes:

a generating module, configured to generate a system message, where the system message carries a tracking area identity of the relay; and a broadcasting module, configured to broadcast the system message and trigger a user equipment in a cell of the relay to initiate a location update request.

An embodiment of the present invention further provides a communication system to reduce signaling load produced during location update, where the communication system includes the foregoing relay, and further includes:

an eNodeB, configured to receive the identity of and tracking area identity of the relay reported by the relay; and a user equipment, configured to send a location update request message.

The relay is further configured to forward the location update request message of the user equipment to an eNodeB; and add the identity of the relay to the forwarded location update request message.

An embodiment of the present invention further provides a mobility management entity to reduce signaling overhead of system paging and save system paging resources, where the mobility management entity includes:

a receiving module, configured to receive a location update request message of a user equipment, where the location update request message carries a tracking area identity of a relay where the user equipment camps; and an updating module, configured to update a tracking area list of the user equipment according to the tracking area identity.

In the embodiments of the present invention, the eNodeB receives the paging message, where the paging message carries the tracking area identity; the eNodeB pages the user equipment if the tracking area identity in the paging message is the tracking area identity of the eNodeB; and the eNodeB instructs the relay to page the user equipment if the tracking area identity in the paging message is the tracking area identity of the relay of the eNodeB. In this manner, the eNodeB acquires whether the user equipment camps on its cell or in the cell of its relay, and performs directional paging on the user equipment. Compared with the prior art technical solution where both the eNodeB and relay of the eNodeB page the user equipment, the technical solution disclosed in the present invention reduces the signaling overhead of system paging and saves system paging resources.

In the embodiments of the present invention, the relay generates a system message, where the system message carries the tracking area of the relay; the relay broadcasts the system message and triggers the user equipment accessing the cell of the relay to initiate a location update request. Different from the prior art technical solution where the user equipment, when accessing the cell of the relay, receives the eNodeB's tracking area identity broadcasted by the relay, the technical solution disclosed in the present invention may effectively reduce signaling load produced during concurrent and frequent location update of a large number of UEs due to mobility of the relay.

In the embodiments of the present invention, the location update request message of the user equipment received by the mobility management entity carries the tracking area identity of the relay where the user equipment camps, which facilitates carrying of the tracking area of the relay in the paging message sent subsequently so that the eNodeB acquires that the user equipment camps on the cell of the relay currently and performs directional paging on the user equipment. Compared with the prior art technical solution where the both the eNodeB and relay page the user equipment, the technical solution disclosed in the present invention reduces signaling overhead of system paging and saves system paging resources.

BRIEF DESCRIPTION OF THE DRAWINGS

The accompanying drawings described here are used to facilitate further understanding of the present invention, which forms a part of this application, but is not constructed as limitation to the present invention. In these drawings.

DETAILED DESCRIPTION OF THE EMBODIMENTS

To make the objectives, technical solutions, and advantages of the present invention clearer, the following describes the embodiments of the present invention with reference to the accompanying drawings. Here, the exemplary embodiments of the present invention and illustrations are used for illustrating the present invention, but not constructed as limitation to the present invention.

Figure 1:
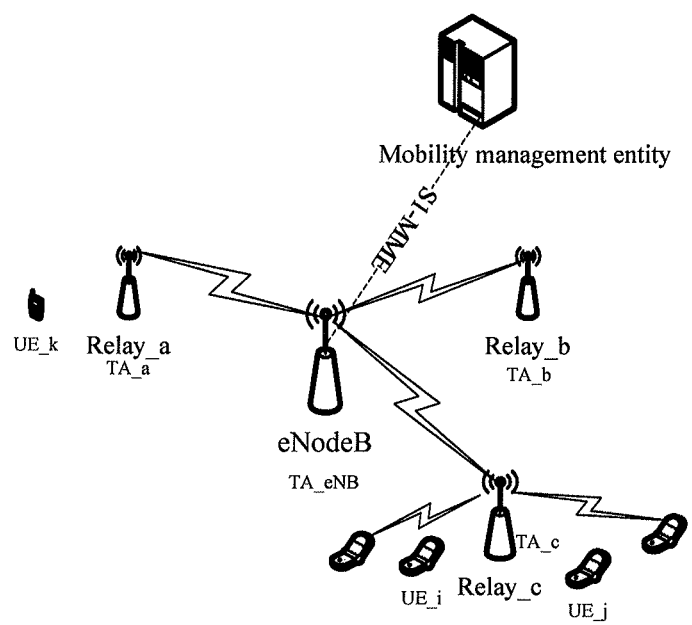
FIG. 1 is a schematic diagram of a network scenario involved according to an embodiment of the present invention.

FIG. 1 is a schematic diagram of a network scenario according to an embodiment of the present invention. As shown in FIG. 1, an MME is a control network element on a network, which is responsible for initiating paging on the user equipment, and the existing interface between the MME and eNB is S1-MME. In order to satisfy the backward compatibility for the LET (Long Term Evolution, long term evolution) user equipment, an interface, that is, Uu interface, between the eNodeB and the user equipment in an original LET network may be reused as the interface between the relay and the user equipment. The relay may be static or mobile. The mobile relay is installed in transportation vehicles such as the train and bus, providing stable and reliable wireless network access services for passengers. In FIG. 1, Relay_a and Relay_b are two fixed relays, and Relay_c is a mobile relay. The eNB is an eNodeB, and the forgoing three relays access the core network through the eNB.

Figure 2:
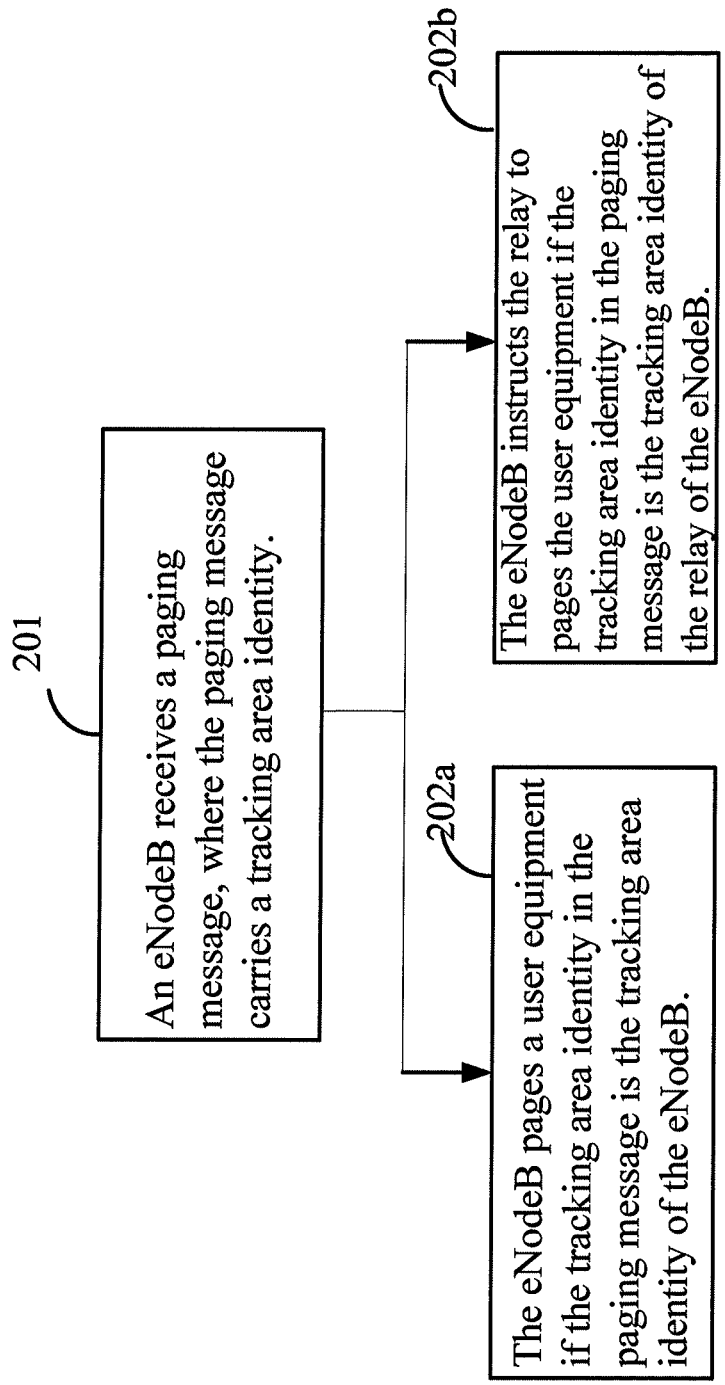
FIG. 2 is a flow chart of a paging method according to an embodiment of the present invention.

As shown in FIG. 2, the process of a paging method according to an embodiment of the present invention may include the following.

Step 201: An eNodeB receives a paging message, where the paging message carries a tracking area identity.

Step 202a: The eNodeB pages a user equipment if the tracking area identity in the paging message is the tracking area identity of the eNodeB.

Step 202b: The eNodeB instructs a relay to page the user equipment if the tracking area identity in the paging message is the tracking area identity of the relay of the eNodeB.

It can be seen from the process shown in FIG. 2, the eNodeB acquires whether the user equipment camps on its cell or in the cell of its relay, and performs directional paging. Compared with the prior art technical solution where both the eNodeB and relay of the eNodeB page the user equipment, the technical solution disclosed in the present invention obviously optimizes the paging process on a relay network, reduces signaling overhead of system paging, and saves system paging resources.

When the network side pages a user equipment, the MML searches out all eNodeBs associated with the TAs according to the current TA list of the user equipment and sends the paging message to these eNodeBs. The TA list of the user equipment is maintained by the MME according to the location information reported by the user equipment. Therefore, according to an embodiment, before the eNodeBs receive the paging message, the paging method may further include:

The eNodeB forwards the location update request message of the user equipment; the tracking area identity in the location update request message is the tracking area identity of the eNodeB when the user equipment camps on a cell of the eNodeB; and the tracking area identity in the location update request message is the tracking area identity of the relay when the user equipment camps on a cell of the relay.

After the eNodeB forwards the location update request message of the user equipment to the MME, the MME updates the tracking area list of the user equipment according to the tracking area identity carried in the location update request message. When the MME delivers a paging message, the paging message may carry the identity and tracking area list of the user equipment.

It is mentioned previously that if the user equipment camps on a cell of the relay, the location update request message of the user equipment may carry the tracking area identity of the relay. The location update request message is generated and sent by the user equipment, and forwarded by the relay and eNodeB to the MME. Therefore, the tracking area identity of the relay may be carried in the location update request message in multiple modes. For example, the tracking area identity of the relay is obtained by the user equipment from the relay and added to the location update request message. For another example, the tracking area identity of the relay is added by the relay to the location update request message. For still another example, the tracking area identity of the relay is obtained by the eNodeB from the relay and added to the location update request message.

According to an embodiment, the user equipment obtaining the tracking area identity from the relay may be: receiving, by the user equipment, the tracking area identity of the relay broadcast by the relay when accessing the cell of the relay. It can be seen that, in the prior at, when the user equipment accesses the cell of the relay, the relay broadcasts the tracking area identity of the eNodeB. However, according to this embodiment, the relay broadcasts the tracking area identity of the relay when the user equipment accesses the cell of the relay. In the prior art, due to the mobility of the relay, the tracking area identity of the eNodeB broadcasted by the relay is changing constantly, and the user equipment initiates the location update request continuously. However, according to this embodiment, even though the relay is moving, the tracking area identity of the relay broadcasted by the relay is relatively unchanged, and the frequency of the location update request initiated by the user equipment is greatly lowered, which effectively reduces the signaling load produced during location update.

Figure 3:
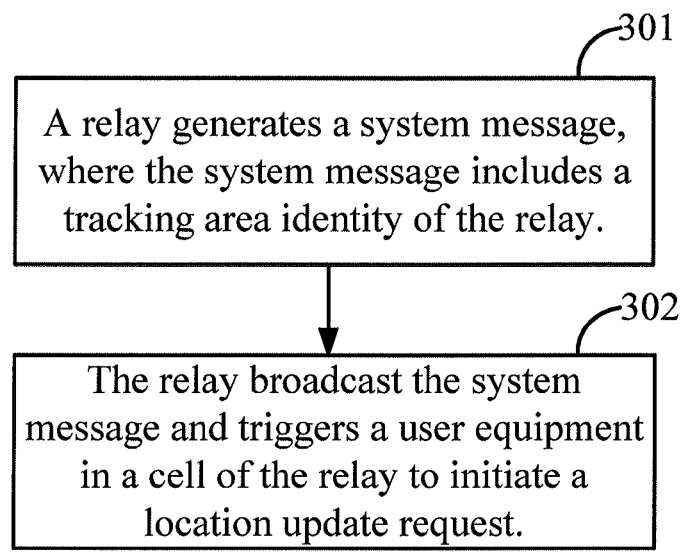
FIG. 3 is a flow chart of a location update method according to an embodiment of the present invention.

As shown in FIG. 3, the present invention may further provide a location update method, whose process may include the following.

Step 301: A relay generates a system message, where the system message includes a tracking area identity of the relay.

Step 302: The relay broadcasts the system message and triggers a user equipment in a cell of the relay to initiate a location update request.

Compared with the prior art, the process shown in FIG. 3 is different from the process where the user equipment, when accessing the cell of the relay, receives the tracking area identity of the eNodeB broadcast by the relay. Through the process shown in FIG. 3, signaling load produced during concurrent location update of a large number of UEs due to mobility of the relay may be effectively reduced.

The location update method shown in FIG. 3 may be either used independently or used in combination with the paging method shown in FIG. 2. When the location update method is used in combination with the paging method, in one aspect, the paging process on a relay network is optimized and a waste of paging resources on the paging network is reduced; and in another aspect, the problem of heavy signaling load produced during location update caused by the added mobile relay is prevented.

To facilitate the eNodeB to determine whether the tracking area identity in the paging message is the tracking area identity of the eNodeB or the tracking area identity of the relay of the eNodeB, according to an embodiment, the eNodeB may determine a first mapping relationship, and determine whether the tracking area identity in the paging message is the tracking area identity of the eNodeB or the relay of the eNodeB according to the first mapping relationship. The first mapping relationship is a mapping relationship between the relay of the eNodeB and the tracking area of the relay.

The first mapping relationship may be stored by the eNodeB for convenient determination, and definitely, it may also be stored by another device. The eNodeB communicates with the device to implement the determination function. If the mapping relationship is stored by the eNodeB, the eNodeB needs to obtain related information about the relay and tracking area of the relay. According to an embodiment of the present invention, the eNodeB may receive the identity of the relay and tracking area identity of the relay reported by the relay when the relay moves to the cell of the eNodeB; and then records the received identity of the relay and tracking area identity of the relay to the first mapping relationship.

The first mapping relationship may be recorded in a mapping table or database for convenient query.

Figure 4:
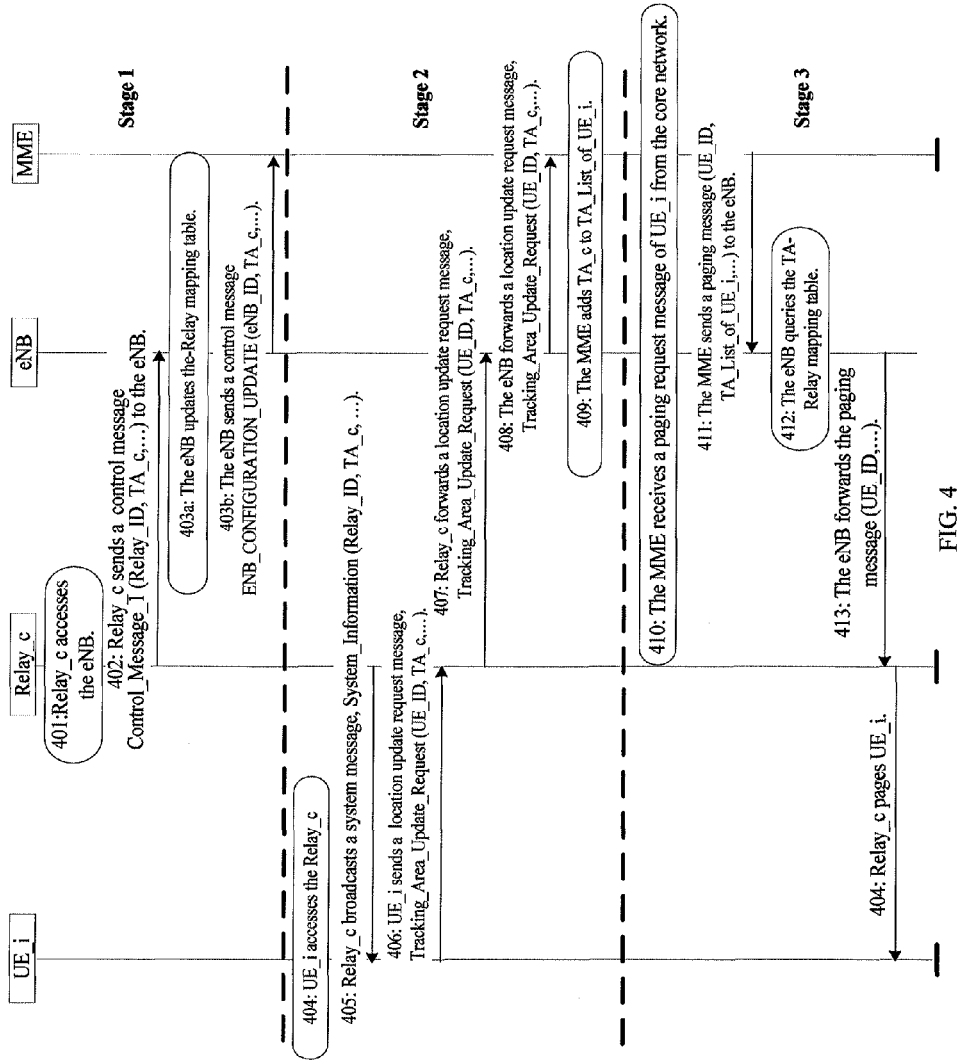
FIG. 4, FIG. 5, and FIG. 6 are flow charts of a specific embodiment of a paging method according to an embodiment of the present invention.

The following takes an example to describe the specific implementation of the paging method with reference to the location update method according to the forgoing embodiment. FIG. 4 is a flow chart of a paging method according to this embodiment. In this example, Relay_c is a mobile relay, and UE_i is under mobile Relay_c. To complete paging on UE_i, the whole process may be divided into three stages, including the following.

Stage 1

Step 401: Relay_c moves to the cell of the eNB.

Step 402: Relay_c sends a control message Control_Message_1 to the eNB. Using Control_Message_1, Relay_c reports the identity of the relay Relay_ID, and the tracking area identity TA_c to the eNB.

Steps 403a-b: The eNB stores a mapping table between the tracking area and relay, TA-Relay mapping table. This mapping table stores the first mapping relationship. After receiving Control_Message_1, the eNB updates the TA-Relay mapping table according to the information in the message first, and then sends a control message from the S1-MME interface to the MME, for example, ENB_CONFIGURATION_UPDATE message. This message includes the identity of the eNB, eNB_ID and the tracking area identity of Relay_c, TA_c. After receiving this control message, the MME acquires that Relay_c camps on the cell of the eNB.

Stage 2

Step 404: A specific user equipment, UE_i, accesses the cell of Relay_c.

Step 405: Relay_c uses the system message to broadcast its identity Relay_ID and tracking area identity TA_c in its cell.

Step 406: After receiving the system message broadcasted by Relay_c, UE_i sends a control message Tracking_Area_Update_Request (Tracking_Area_Update_Request) to Relay_c to initiate a location update. The Tracking_Area_Update_Request message is defined in the existing standards. According to the standards, this message includes the user equipment identity UE_ID, and the identity of the tracking area identity TA_c.

Step 407: Relay_c does not process this message after receiving this message, but directly forwards this message to the eNB.

Step 408: The eNB does not process this message after receiving this message, but directly forwards this message to the MME.

Step 409: The MME maintains a tracking area list for each UE. After receiving the Tracking_Area_Update_Request message sent by UE_i, the MME adds TA_c to the tracking area list TA_List_of_UE_i. All response messages Tracking_Area_Update_Response in response to the Tracking_Area_Update_Reques messages sent from the network side are omitted in FIG. 3.

Stage 3

Step 410: The MME receives a paging message of UE_i from the core network.

Step 411: The MME sends a paging message to the eNB, where the paging message includes the UE_i identity, UE_ID, and the tracking area list of UE_i, TA_List_of_UE_i.

Step 412: After receiving the paging message, the eNB queries the TA-Relay mapping table according to the tracking area identitys listed in TA_List_of_UE_i.

Step 413: TA_List_of_UE_i may merely include TA_c, and does not include the tracking area identity of the eNB and relays of the eNB. Therefore, the eNB may send this paging message to Relay_c only to trigger Relay_c pages UE_i, rather than page UE_i in its cell or trigger its relay to page UE_i.

Step 414: Relay_c pages UE_i.

It is mentioned previously that the first mapping relationship is a mapping relationship between the relay of the eNodeB and the tracking area of the relay. According to another embodiment, the eNodeB may also determine the second mapping relationship and determine, according to the second mapping relationship, whether the tracking area identity in the paging message is the tracking area identity of the eNodeB or the relay of the eNodeB. The second mapping relationship is a mapping relationship among the relay of the eNodeB, tracking area of the relay, and UE camping on the cell of the relay.

Definitely, similar to the first mapping relationship, the second mapping relationship may also be stored by the eNodeB for convenient determination, and definitely it may also be stored by another device. The eNodeB communicates with the device to implement the determination function. If the mapping relationship is stored by the eNodeB, the eNodeB needs to obtain related information about the relay, tracking area of the relay, and user equipment camping on the cell of the relay. According to an embodiment, the eNodeB may receive the identity of the relay and tracking area identity of the relay reported by the relay when the relay moves to the cell of the eNodeB; and records the received identity of the relay and tracking area identity of the relay to the second mapping relationship.

The second mapping relationship may also be updated by the eNodeB according to the identity of the relay and tracking area identity of the relay, and user equipment identity in the location update request message. In implementation, the identity of the relay may be added by the relay to the location update request message.

Definitely, the second mapping relationship may also be recorded in a mapping table or database for convenient query.

Figure 5:
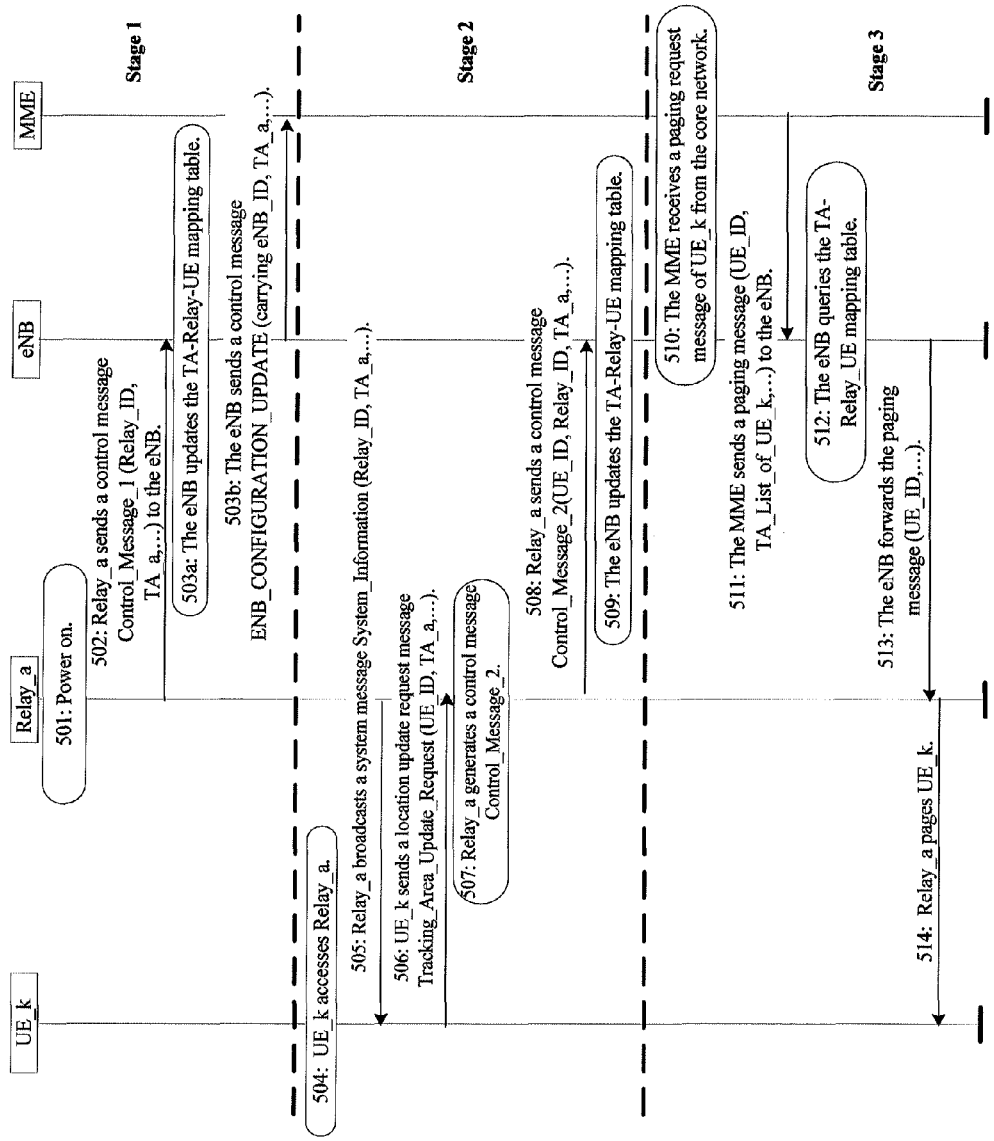

The following takes an example to describe the implementation of the paging method with reference to the location update method according to the forgoing embodiment. FIG. 5 is a flow chart of a paging method according to this embodiment. In this embodiment, Relay_a is a fixed relay and UE_k is a user equipment camping on Relay_a. The whole process may still be divided into three different stages. The following mainly describes the difference between the flow chart shown in FIG. 5 and that in FIG. 4.

In stage 1, in steps 501 and 502, Relay_a sends a control message Control_Message_1 to the eNB automatically, and the definition and function of this control message are the same as those of Control_Message_1 in FIG. 4. Different from FIG. 4, in step 503a, the eNB maintains internally a tracking area, and TA-Relay-UE mapping table, between the tracking area, relay, and user equipment. This mapping table stores the second mapping relationship. After receiving Control_Message_1, the eNB adds the mapping relationship between the Relay_a and another tracking area TA_a to the mapping table. In this stage, the subsequent message (step 503b) and process are the same as those shown in FIG. 4.

In stage 2, in step 504, UE_k moves to the cell of Relay_a, similar to FIG. 4. In step 505, Relay_a broadcasts its identity and tracking area identity in its cell. In step 506, after receiving the broadcast message from Relay_a, UE_k sends a control message Tracking_Area_Update_Request to Relay_a. Different from process shown in FIG. 4, in step 507, Relay_a processes this control message to generate another control message Control_Message_2. Compared with Tracking_Area_Update_Request, Control_Message 2 has one extra parameter, that is, Relay_ID of Relay_a. In steps 508 and 509, Relay_a sends Control_Message_2. After receiving Control_Message_2, the eNB updates the TA-Relay-UE mapping table according to the information included in Control_Message_2, and the eNB acquires that UE_k camps on the cell of Relay_a.

In stage 3, similar to the process shown in FIG. 4, in step 512, after receiving a paging message, the eNB queries the TA-Relay-UE mapping table to determine that UE_k camps on the cell of Relay_a. Therefore, in step 513, the eNB directly sends the paging message to Relay_a, and then step 514 is performed. Relay_a starts to page UE_k in its cell.

According to an embodiment, to reduce reconstruction to the relay, the location update request message of the user equipment may be an access domain message. The following takes an example for illustration. Compared with FIG. 5, the paging process shown in FIG. 6 differs from that in FIG. 5 in stage 2. Therefore, stage 1 and stage 3 are not omitted in FIG. 6.

Figure 6:
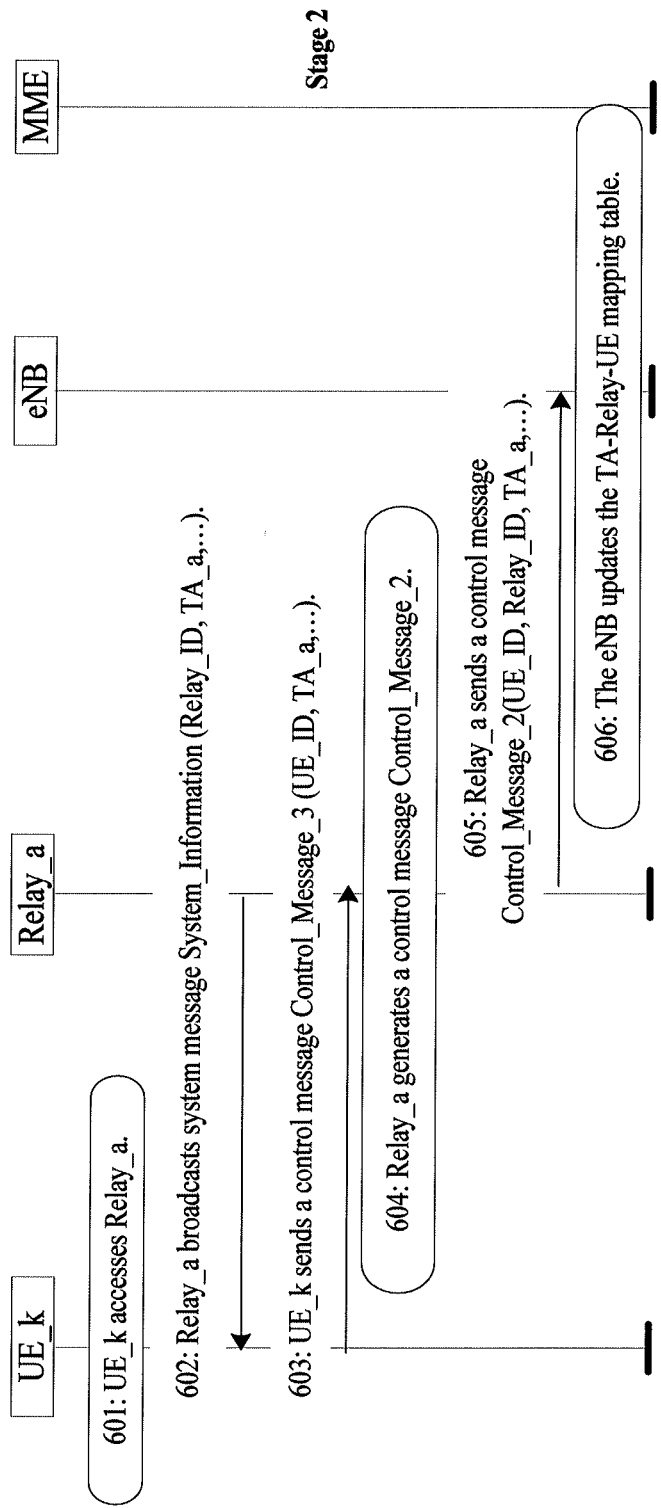

In FIG. 6, in step 601, UE_k moves to the cell of Relay_a. In step 602, UE_k receives a system message of Relay_a. However, in step 603, UE_k does not send the message Tracking_Area_Update_Request to Relay_a but sends a newly defined control message Control_Message_3. The Tracking_Area_Update_Request is a non-access domain message, so in FIG. 5, Relay_a needs to be greatly reconstructed to process this message. However, the Control_Message_3 in FIG. 6 is an access domain message, and Relay_a may process this message without too much reconstruction. Similar to the Tracking_Area_Update_Request, the Control_Message_3 includes a UE_k identity, UE_ID, and a tracking area identity, TA_a. The following steps 604-606 are similar to those shown in FIG. 5.

The embodiments of the present invention may further be applicable to a multi-hop relay network, that is, the relay in FIG. 1 may further be cascaded with another relay. In this case, the technical key points and protection points are still applicable and the eNodeB in the description is also a relay.

Persons of ordinary skill in the art may understand that all or part of steps according to the embodiments of the present invention may be implemented by a program instructing relevant hardware. The programs may be stored in a computer readable storage medium. When the programs are executed, the steps of the method in the embodiment are executed. The storage medium may include: a read-only memory (ROM), a random access memory (RAM), a magnetic disk or an optical disk.

The embodiments of the present invention further provide an eNodeB, a relay, and a communication system, as described in the following embodiments. The principle of these devices solving problems is similar to the paging method and location update method. Therefore, for implementations of these devices, reference can be made to those of the methods, and similar contents are not described here again.

Figure 7:
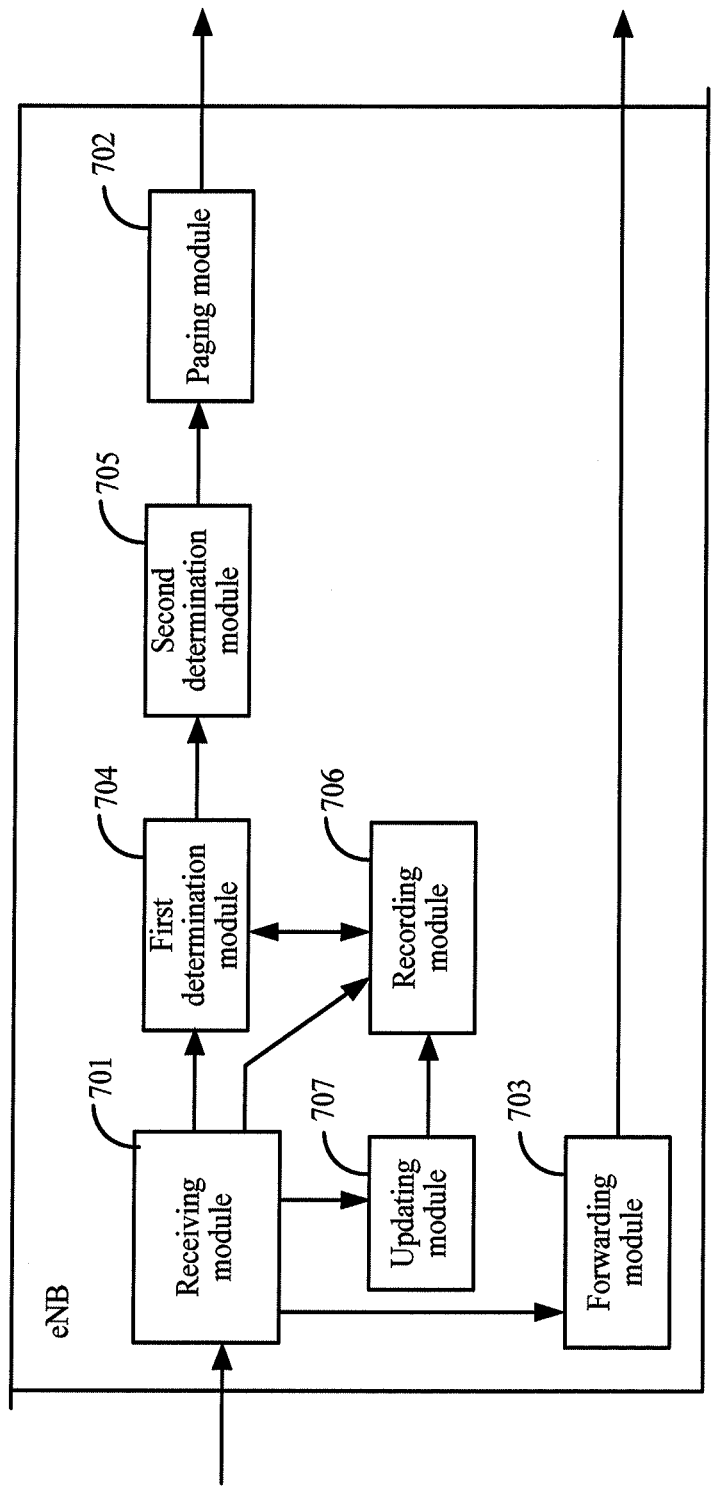
FIG. 7 is a schematic structure diagram of an eNodeB according to an embodiment of the present invention.

An embodiment of the present invention provides an eNodeB, whose structure is shown in FIG. 7. The eNodeB may include:

a receiving module 701, configured to receive a paging message, where the paging message carries a tracking area identity; and a paging module 702, configured to page a user equipment when the tracking area identity in the paging message is the tracking area identity of the eNodeB; and instruct a relay to page the user equipment when the tracking area identity in the paging message is the tracking area identity of the relay of the eNodeB.

According to an embodiment, the eNodeB shown in FIG. 7 may further include:

a forwarding module 703, configured to forward a location update request message of the user equipment; where the tracking area identity in the location update request message is the tracking area identity of the eNodeB when the user equipment camps on a cell of the eNodeB; and the tracking area identity in the location update request message is the tracking area identity of the relay when the user equipment camps on a cell of the relay.

According to an embodiment, the eNodeB shown in FIG. 7 may further include:

a first determination module 704, configured to determine a first mapping relationship or a second mapping relationship; where the first mapping relationship is a mapping relationship between the relay of the eNodeB and the tracking area of the relay; and the second mapping relationship is a mapping relationship among the relay of the eNodeB, the tracking area of the relay, and a user equipment camping on a cell of the relay; and a second determination module 705, configured to determine whether the tracking area identity in the paging message is the tracking area identity of the eNodeB or the relay of the eNodeB according to the first or second mapping relationship.

According to an embodiment, the receiving module 701 is further configured to receive the identity of the relay and tracking area identity of the relay reported by the relay after the relay moves to a cell of the eNodeB. The eNodeB shown in FIG. 7 may further include a recording module 706, configured to record the received identity of the relay and tracking area identity of the relay into the first or second mapping relationship.

According to an embodiment, the eNodeB shown in FIG. 7 may further include:

an updating module 707, configured to update the second mapping relationship according to the identity of the relay and tracking area identity of the relay, and user equipment identity in the location update request message, where the identity of the relay is added by the relay to the location update request message.

According to an embodiment, the first determination module 704 is further configured to determine the first or second mapping relationship by querying a mapping table or database.

Figure 8:
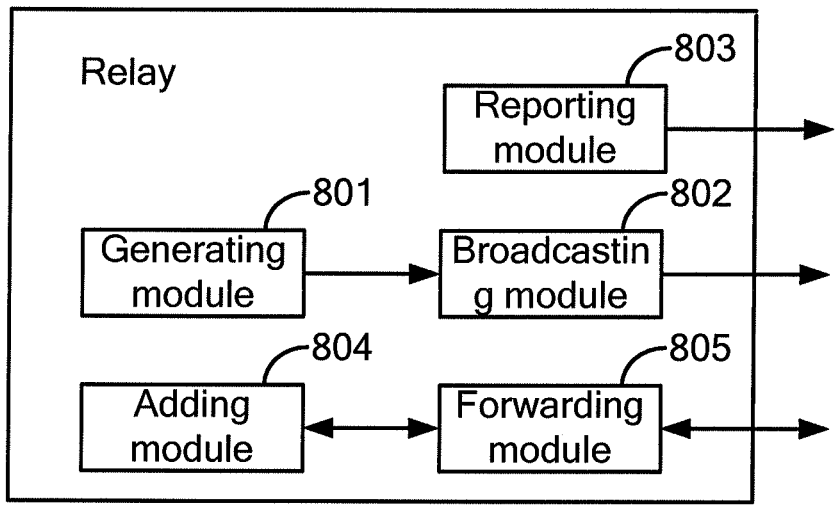
FIG. 8 is a schematic structure diagram of a relay according to an embodiment of the present invention.

An embodiment of the present invention further provides a relay, whose structure is shown in FIG. 8. The relay may include:

a generating module 801, configured to generate a system message, where the system message carries a tracking area identity of the relay; and a broadcasting module 802, configured to broadcast the system message and trigger a user equipment in a cell of the relay to initiate a location update request.

According to an embodiment, the relay shown in FIG. 8 may further include:

a reporting module 803, configured to report the identity of the relay and tracking area identity of the relay to an eNodeB when the relay moves to a cell of the eNodeB.

According to an embodiment, the relay shown in FIG. 8 may further include:

a forwarding module 804, configured to forward the location update request message of the user equipment to the eNodeB; and an adding module 805, configured to add the identity of the relay to the location update request message forwarded by the forwarding module.

Figure 9:
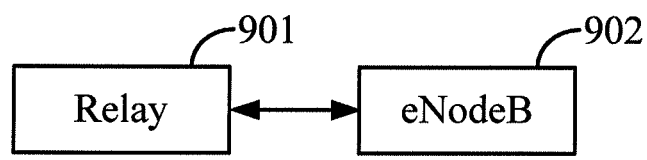
FIG. 9 is a schematic structure diagram of a communication system according to an embodiment of the present invention.

As shown in FIG. 9, an embodiment of the present invention further provides a communication system, including a relay 901 shown in FIG. 8. The communication system further includes:

an eNodeB 902, configured to receive the identity of and tracking area identity of the relay reported by the relay.

The relay 901 is configured to forward a location update request message of a user equipment to the eNodeB; and add the identity of the relay to the forwarded location update request message.

Figure 10:
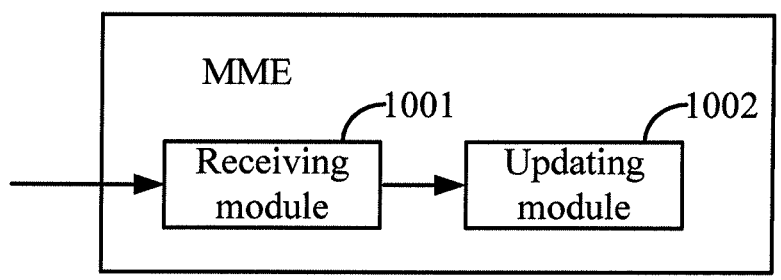
FIG. 10 is a schematic structure diagram of a mobility management entity according to an embodiment of the present invention.

As shown in FIG. 10, according to an embodiment of the present invention, a mobility management entity may include:

a receiving module 1001, configured to receive a location update request message of a user equipment, where the location update request message carries a tracking area identity of a relay where the user equipment camps; and an updating module 1002, configured to update a tracking area list of the user equipment according to the tracking area identity.

In the embodiments of the present invention, the eNodeB receives the paging message, where the paging message carries the tracking area identity; the eNodeB pages the user equipment if the tracking area identity in the paging message is the tracking area identity of the eNodeB; and the eNodeB instructs the relay to page the user equipment. Thereby, the eNodeB acquires whether the user equipment camps on its cell or in the cell of its relay, and then performs directional paging. Compared with the prior art technical solution where both the eNodeB and relay of the eNodeB page the user equipment, the technical solution disclosed in the present invention reduces the signaling overhead of system paging and saves system paging resources.

In the embodiments of the present invention, the relay generates a system message, where the system message carries the tracking area of the relay; the relay broadcasts the system message and triggers the user equipment accessing the cell of the relay to initiate a location update request. Different from the technical solution where the user equipment, when accessing the cell of the relay, receives the eNodeB's tracking area identity broadcast by the relay, the technical solution disclosed in the present invention may effectively reduce signaling load produced by concurrent location update of a large number of UEs due to mobility of the relay.

The paging method and location update method according to the present invention may be used in a combined manner, which, in one aspect, effectively reduces signaling load produced by concurrent location update of a large number of UEs due to mobility of the relay; and in another aspect, reduces a waste of paging resources on the relay network to achieve a desirable balance between the signaling load produced in location update and the signaling load produced in system paging.

In the embodiments of the present invention, the mobility management entity receives the location update request message of the user equipment, where the location update request message carries the tracking area identity of the relay where the user equipment camps. This facilitates carrying of, the tracking area of the relay in the paging message issued subsequently so that the eNodeB acquires that the user equipment camps on the cell of the relay, and then performs directional paging. Compared with the prior art technical solution where the both the eNodeB and relay page the user equipment, the technical solution disclosed in the present invention reduces signaling overhead of system paging and saves system paging resources.

According to the forgoing specific embodiments, the objective, technical solutions, and beneficial effects of the present invention are further described in details. It should be understood that the forgoing embodiments are merely exemplary embodiments, but not constructed as limitation to the protection scope of the present invention. Any modification and equivalent replacement made without departing from the spirit and principle of the present invention should fall within the protection scope of the present invention.

What is claimed is:

1. A paging method, wherein the method comprises:
   receiving, by an eNodeB, a paging message, wherein the paging message carries a tracking area identity;
   paging, by the eNodeB, a user equipment if the tracking area identity in the paging message is the tracking area identity of the eNodeB; and
   instructing, by the eNodeB, a relay to page the user equipment if the tracking area identity in the paging message is the tracking area identity of the relay of the eNodeB.

2. The method according to claim 1, wherein before the eNodeB receives the paging message, the method further comprises:
   forwarding, by the eNodeB, a location update request message of the user equipment;
   wherein the tracking area identity in the location update request message is the tracking area identity of the eNodeB when the user equipment camps on a cell of the eNodeB; and
   the tracking area identity in the location update request message is the tracking area identity of the relay when the user equipment camps on a cell of the relay.

3. The method according to claim 2, wherein the location update request message comprises an access domain message.

4. The method according to claim 2, wherein when the user equipment camps on the cell of the relay, the tracking area identity of the relay is:
   obtained by the user equipment from the relay and added to the location update request message;
   or added by the relay to the location update request message;
   or obtained by the eNodeB from the relay and added to the location update request message.

5. The method according to claim 4, wherein the tracking area identity of the relay is obtained by the user equipment from the relay comprises:
   receiving, by the user equipment, the tracking area identity of the relay broadcasted by the relay when accessing the cell of the relay.

6. The method according to claim 1, the method further comprising:
   determining, by the eNodeB, a first mapping relationship or a second mapping relationship;
   wherein the first mapping relationship is a mapping relationship between the relay of the eNodeB and the tracking area of the relay; and
   the second mapping relationship is a mapping relationship among the relay of the eNodeB, the tracking area of the relay, and user equipment camping on a cell of the relay;
   determining, by the eNodeB, whether the tracking area identity in the paging message is the tracking area identity of the eNodeB or the relay of the eNodeB according to the first or second mapping relationship.

7. The method according to claim 6, wherein the method further comprises:
   receiving, by the eNodeB, the identity of the relay and tracking area identity of the relay reported by the relay after the relay of the eNodeB moves to a cell of the eNodeB or after the relay powers on; and
   recording, by the eNodeB, the received identity of the relay and tracking area identity of the relay into the first or second mapping relationship.

8. The method according to claim 7, wherein the method further comprises:
updating, by the eNodeB, the second mapping relationship according to the identity of the relay and tracking area identity of the relay, and user equipment identity;
wherein the identity of the relay is added by the relay to the location update request message.

9. The method according to claim 7, the method further comprises:
sending, by the eNodeB, a message including the tracking area identity of the relay to Mobility Management Entity (MME).

10. The method according to claim 6, wherein the eNodeB determining the first or second mapping relationship comprises:
determining, by the eNodeB, the first or second mapping relationship by querying a mapping table or database.

11. A location update method, wherein the method comprises:
generating, by a relay, a system message, wherein the system message carries a tracking area identity of the relay; and
broadcasting, by the relay, the system message directly to a plurality of user equipments (UEs), and
triggering the plurality of UEs in a cell of the relay to initiate a location update request.

12. The method according to claim 11, wherein before the relay generates the system message, the method further comprises:
reporting, by the relay, the identity of the relay and the tracking area identity of the relay to an eNodeB after the relay moves to a cell of the eNodeB or after the relay powers on.

13. The method according to claim 11, wherein after the relay broadcasts the system message, the method further comprises:
forwarding, by the relay, the location update request message of the user equipment to an eNodeB; and adding the identity of the relay to the forwarded location update request message.

14. An eNodeB, comprising:
a receiving module, configured to receive a paging message, wherein the paging message carries a tracking area identity; and
a paging module, configured to page a user equipment when the tracking area identity in the paging message is the tracking area identity of the eNodeB; and instruct a relay to page the user equipment when the tracking area identity in the paging message is the tracking area identity of the relay of the eNodeB.

15. The eNodeB according to claim 14, further comprising:
a forwarding module, configured to forward a location update request message of the user equipment; wherein the tracking area identity in the location update request message is the tracking area identity of the eNodeB when the user equipment camps on a cell of the eNodeB; and the tracking area identity in the location update request message is the tracking area identity of the relay when the user equipment camps on a cell of the relay.

16. The eNodeB according to claim 14, further comprising:
a first determination module, configured to determine a first mapping relationship or a second mapping relationship; wherein the first mapping relationship is a mapping relationship between the relay of the eNodeB and the tracking area of the relay; and the second mapping relationship is a mapping relationship among the relay of the eNodeB, the tracking area of the relay, and user equipment camping on a cell of the relay; and a second determination module, configured to determine whether the tracking area identity in the paging message is the tracking area identity of the eNodeB or the relay of the eNodeB according to the first or second mapping relationship.

17. The eNodeB according to claim 16, wherein the receiving module is further configured to receive the identity of the relay and tracking area identity of the relay reported by the relay after the relay moves to a cell of the eNodeB or after the relay powers on; and
the eNodeB further comprises:
a recording module, configured to record the received identity of the relay and tracking area identity of the relay into the first or second mapping relationship.

18. The eNodeB according to claim 17, further comprising:
an updating module, configured to update the second mapping relationship according to the identity of the relay and tracking area identity of the relay in the location update request message, and user equipment identity;
wherein the identity of the relay is added by the relay to the location update request message.

19. The eNodeB according to claim 16, wherein the first determining module is further configured to determine the first or second mapping relationship by querying a mapping table or database.

20. A relay, comprising:
a generating module, configured to generate a system message, wherein the system message carries a tracking area identity of the relay; and
a broadcasting module, configured to broadcast the system message directly to a plurality of user equipments (UEs) and trigger the plurality of UEs in a cell of the relay to initiate a location update request.

21. The relay according to claim 20, further comprising:
a reporting module, configured to report the identity of the relay and tracking area identity of the relay to an eNodeB after the relay moves to a cell of the eNodeB or after the relay powers on.

22. The relay according to claim 20, further comprising:
a forwarding module, configured to forward the location update request message of the user equipment to an eNodeB; and
an adding module, configured to add the identity of the relay to the location update request message forwarded by the forwarding module.

23. A communication system, comprising:
the relay according to claim 20;
an eNodeB configured to receive the identity of the relay and tracking area identity of the relay reported by the relay,
wherein the relay is configured to forward a location update request message of a user equipment to the eNodeB and add the identity of the relay to the forwarded location update request message.

24. A non-transitory computer readable medium having stored thereon computer program instruction code for performing a mobile paging operation, the instruction code being executable by a computer unit to cause the computer unit to perform acts of:
receiving a paging message, wherein the paging message carries a tracking area identity;
paging a user equipment if the tracking area identity in the paging message is the tracking area identity of the eNodeB; and
instructing a relay to page the user equipment if the tracking area identity in the paging message is the tracking area identity of the relay of the eNodeB.

* * * * *